(12) United States Patent
Lin

(10) Patent No.: US 8,441,954 B2
(45) Date of Patent: May 14, 2013

(54) ROUTER AND METHOD FOR DISTINGUISHING REAL-TIME PACKETS IN THE ROUTER

(75) Inventor: Wen-Kuang Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 300 days.

(21) Appl. No.: 12/939,179

(22) Filed: Nov. 4, 2010

(65) Prior Publication Data

US 2012/0044819 A1    Feb. 23, 2012

(30) Foreign Application Priority Data

Aug. 20, 2010   (CN) .......................... 2010 1 0259406

(51) Int. Cl.
*H04L 12/26*   (2006.01)

(52) U.S. Cl.
USPC ....................................................... 370/252

(58) Field of Classification Search .................. 370/230, 370/230.1, 232–235, 237, 241–246, 250
See application file for complete search history.

(56) References Cited

U.S. PATENT DOCUMENTS

| 6,563,796 B1 * | 5/2003 | Saito | 370/252 |
| 2008/0107084 A1 * | 5/2008 | Pichna et al. | 370/332 |

* cited by examiner

*Primary Examiner* — Andrew Lai
*Assistant Examiner* — Zhiren Qin
(74) *Attorney, Agent, or Firm* — Altis Law Group, Inc.

(57) ABSTRACT

A router and method distinguishes real-time packets in the router. The router reads information of reference packets and a packet length of a test packet. A packet arrival rate of the test packet, an inter-arrival time standard deviation of the test packet, and a packet length standard deviation of the test packet are calculated according to the information of the reference packets. The router marks the test packet as the real-time packets in response to a determination that the packet length of the test packet falls in the allowable range, the packet arrival rate of the reference packets falls in the allowable range, the inter-arrival time standard deviation of the test packet falls in the allowable range, and the packet length standard deviation of the test packet falls in the allowable range.

18 Claims, 4 Drawing Sheets

ROUTER AND METHOD FOR DISTINGUISHING REAL-TIME PACKETS IN THE ROUTER

BACKGROUND

1. Technical Field

Embodiments of the present disclosure relate to detection technology, and particularly to a router and method for distinguishing real-time packets in the router.

2. Description of Related Art

In information technology, real-time packets are packets having a standardized packet format for delivering audio and video over IP networks. The real-time packets are required to be delivered in a timely manner to a desired destination (e.g., a client computer).

A router is a network device whose software and hardware are customized to the routing and forwarding of the packets. Generally, each packet contains a tag that shows a priority of the packet, for example, a real-time packet has the highest priority. The router can easily and quickly route and forward the real-time packet to get better performance of routing according to the tag. However, many real time packets have no such tags to show their priorities. In such situation, it is difficult for the router to timely route and forward the real-time packets having no such tags.

DETAILED DESCRIPTION

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

As used herein, the term, "packet arrival rate" may be defined as the number of packets arriving at a router per unit time (e.g., a second). Likewise, the term, "packet length" may be defined as a packet size, for example, the packet length of a packet is 20 bytes. It may be understood that the term, "inter-arrival time" may refer to a time between two consecutive packets arriving at the router. These terms, with reference to the FIGS. 1-4, will be described in greater detail below.

Figure 1:
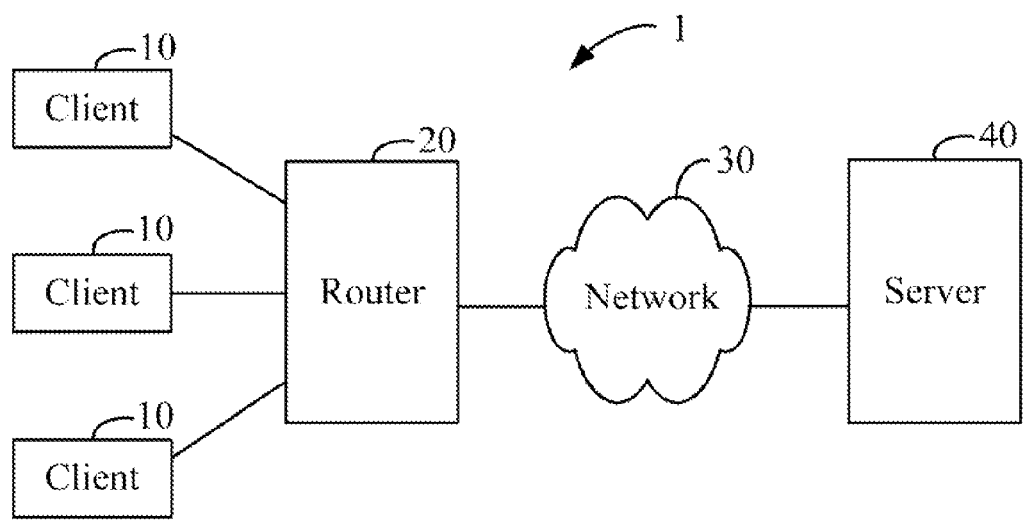
FIG. 1 is a block diagram of one embodiment of a packet distinguishing system.

FIG. 1 is a block diagram of one embodiment of a packet distinguishing system 1. The packet distinguishing system 1 includes one or more clients 10, a router 20, a network 30, and a server 40. The one or more clients 10 establish a communication connection with the server 30 via the router 20 and the network 30.

The one or more clients 10 are electronically connected to the router 20. The clients 10 may be, but are not limited to, a data processing device or a computing device such as a personal computer, or an application server.

Figure 4:
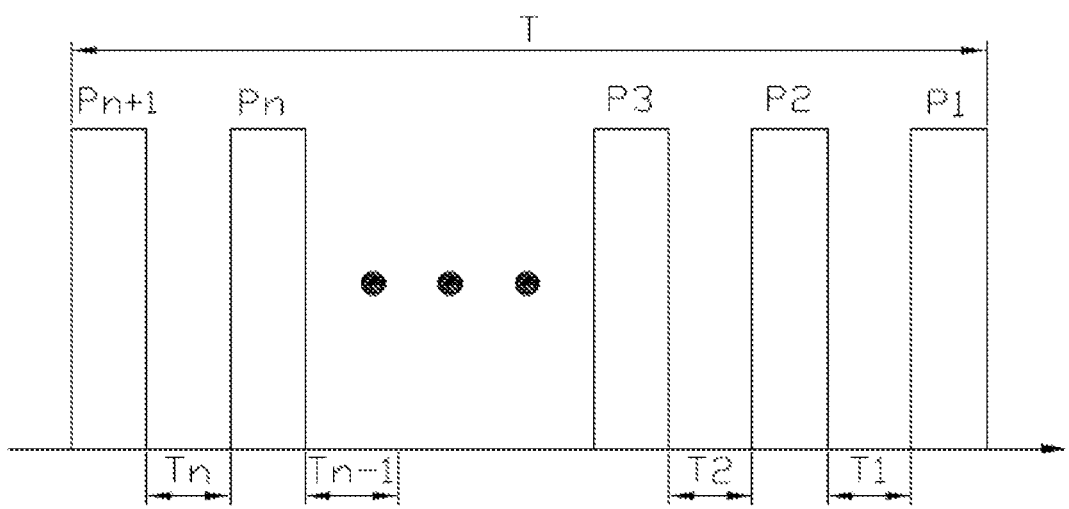
FIG. 4 illustrates one embodiment of a distribution of the packets.

The router 20 is electronically connected to the network 30. The router 20 may be, but is not limited to, a cable router or a wireless router. It is understood that the router 20 is an electronic device that interconnects between the clients 10 and the server 40, and selectively interchanges packets between the clients 10 and the server 40. The router 20 is used to distinguish real-time packets from all types of packets interchanged between the clients 10 and the server 40. Further details of the server 40 will be described below. It is understood that real-time packets are packets that satisfy preset standards. In one embodiment, the preset standards may include an allowable range of a packet length, an allowable range of a packet arrival rate, an allowable range of an inter-arrival time standard deviation, and an allowable range of a packet length standard deviation. For example, as shown in FIG. 4, if the packet $P_1$ is a real-time packet, then the packet length of $P_1$ falls in the allowable range, the packet arrival rate of $P_1$ falls in the allowable range, the inter-arrival time standard deviation of $P_1$ falls in the allowable range, and the packet length standard deviation of $P_1$ falls in the allowable range.

In one embodiment, the network 30 may be a wide area network (e.g., the Internet) or a local area network.

The server 40 is electronically connected to the network 30. The server 40 may be, but is not limited to, a data processing device or a computing device such as a personal computer, an application server, a workstation, a file transfer protocol (FTP) server, or a hypertext transfer protocol (HTTP) server.

Figure 2:
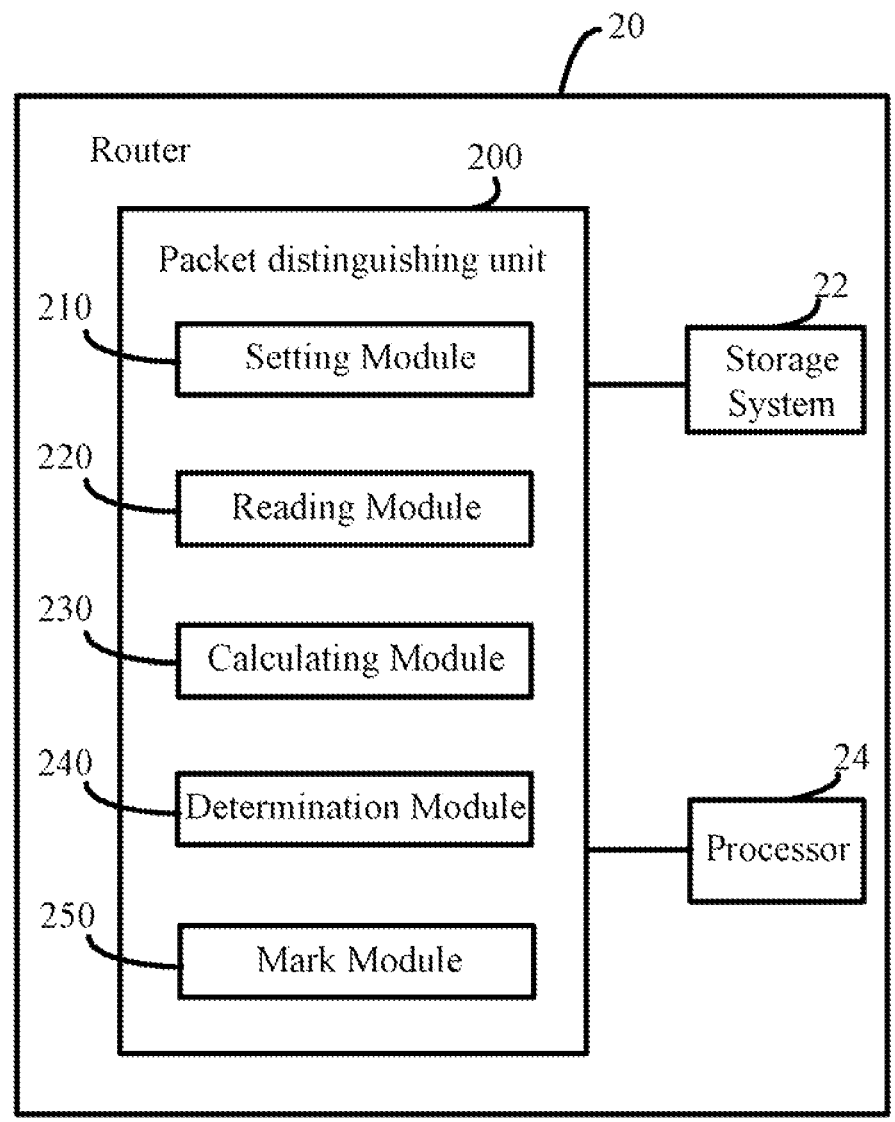
FIG. 2 is a block diagram of one embodiment of function modules of a router in FIG. 1.

FIG. 2 is a block diagram of one embodiment of the function modules of the router 20. The router 20 includes a packet distinguishing unit 200, a storage system 22 and at least one processor 24. The packet distinguishing unit 200 automatically distinguishes a real-time packet in the router 20. In one embodiment, the real-time packet distinguishing unit 200 includes a setting module 210, a reading module 220, a calculating module 230, a determination module 240, and a mark module 250. The modules 210-250 may include computerized code in the form of one or more programs that are stored in the storage system 22. The computerized code includes instructions that are executed by the at least one processor 24 to provide functions for modules 210-250. The storage system 22 may be, but are not limited to, a memory, a hard disk driver, flash memory, or a cache.

The setting module 210 sets parameters for distinguishing the real-time packets. In one embodiment, the parameters include the allowable range of the packet length, the allowable range of the packet arrival rate, the allowable range of the inter-arrival time standard deviation, the allowable range of the packet length standard deviation, a number of reference packets. It should be understood that the term "reference packets" may be defined as packets used to determine if the test packets are the real-time packets. Additionally, the reference packets are consecutive. Further details of the determination using the reference packets will be described below.

The reading module 220 reads information of the reference packets and the packet length of the test packet. In one embodiment, the information of the reference packets includes a total time that the router 20 receives all of the reference packets and the test packet, an inter-arrival time between two consecutive reference packets and a packet length of each reference packet.

The calculating module 230 calculates the packet arrival rate of the test packet, the inter-arrival time standard deviation of the test packet, the packet length standard deviation of the test packet according to the information of the reference packets.

One embodiment of a formula $R_{n+1}$ for calculating the packet arrival rate of the test packet $P_{n+1}$ is described as follows: $R_{n+j}=(n+j)/T$, j=1, 2, 3, . . . ; where, n is equal to the number of the reference packets, T is the total time that router 20 receives all of the packets from $P_1$ to $P_{n+j}$.

One embodiment of a formula $I_{n+j}$ for calculating the inter-arrival time standard deviation of the test packet $P_{n+j}$ is described as follows:

$$I_{n+j} = \sqrt{\frac{\sum_{i=j}^{n+j-2}(t_i - \bar{t})}{n-1}}, i = j, j = 1, 2, 3...$$

where, n is equal to the number of the reference packets, $t_{i+j-1}$ is the inter-arrival time between the reference packet $P_{i+j-1}$ and the reference packet $P_{i+j-2}$, and $\bar{t}$ is an average inter-arrival time of all reference packets from $P_j$ to $P_{n+j-1}$.

One embodiment of a formula $D_{n+j}$ for calculating the packet length standard deviation of the test packet $P_{n+j}$ is described as follows:

$$D_{n+j} = \sqrt{\frac{\sum_{i=j}^{n+j-1}(h_i - \bar{h})}{n}}, i = j, j = 1, 2, 3...$$

where, n is equal to the number of the reference packets, $h_{i+j-1}$ is the packet length of the reference packet $P_{i+j-1}$ and $\bar{h}$ is an average packet length of all reference packets from $P_j$ to $P_{n+j-1}$.

The determination module 240 determines if the test packet is the real-time packet. In one embodiment, the determination module 240 determines the test packet is the real-time packet upon the condition that the packet length of the test packet falls in the allowable range, the packet arrival rate of the reference packets falls in the allowable range, the inter-arrival time standard deviation of the test packet falls in the allowable range, and the packet length standard deviation of the test packet falls in the allowable range.

The mark module 250 marks the test packet as the real-time packet. In one embodiment, if the test packet is determined as the real-time packet, the mark module 250 inserts a tag into the test packet. It is understood that the tag includes attribute information that indicates the packet as the real-time packet. The network device (e.g., a switch, a modem, or the router 20) may easily and quickly identify the packet as the real-time packet when the network device reads the tag.

Figure 3:
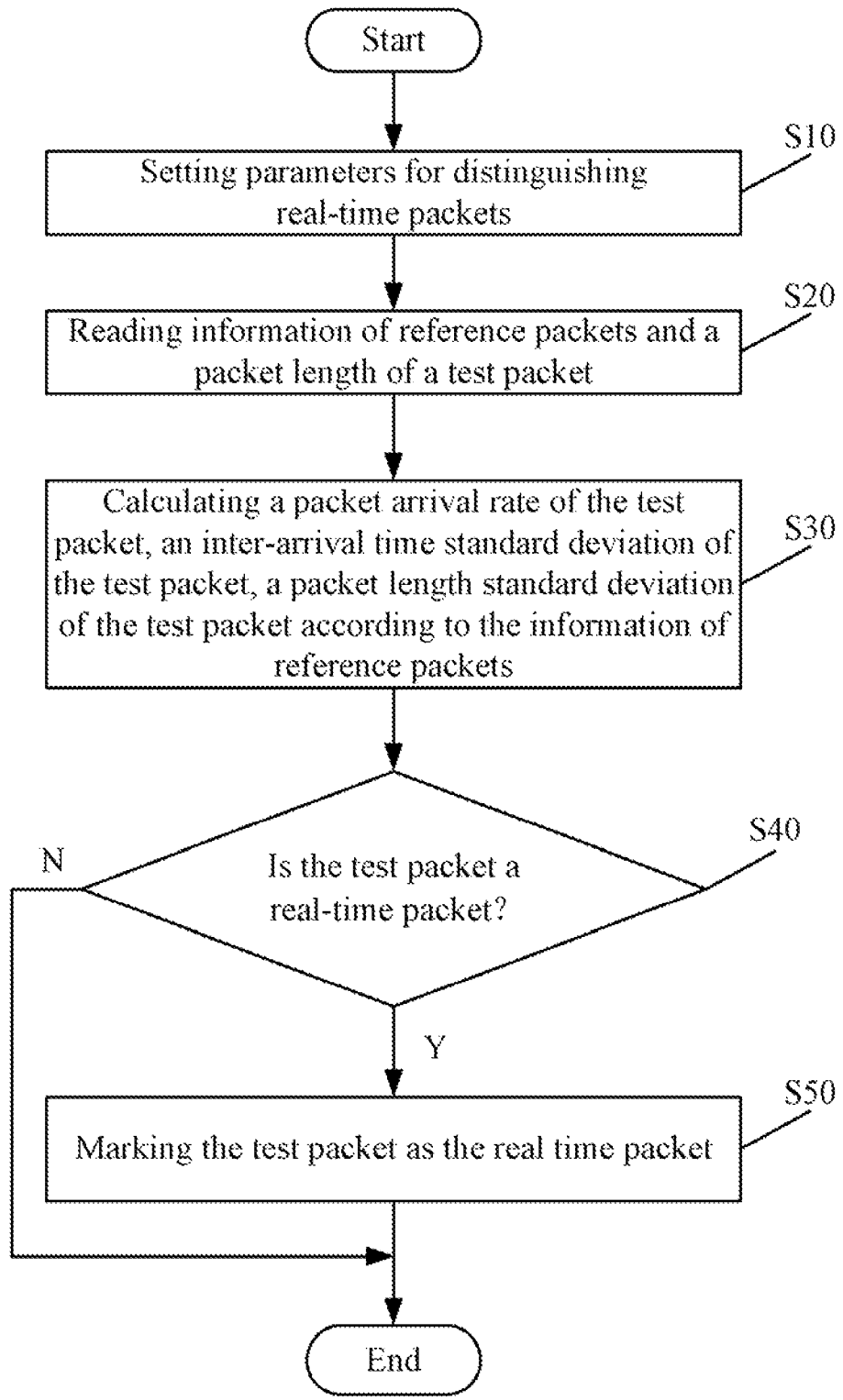
FIG. 3 is a flowchart of one embodiment of a method for distinguishing a real-time packet using the router.

FIG. 3 is a flowchart of one embodiment of a method for distinguishing real-time packets using the router 20. The method may be used to distinguish real-time packets from all types of packets transmitted by the router 20. Depending on the embodiment, additional blocks may be added, others deleted, and the ordering of the blocks may be changed.

In block S10, the setting module 210 sets parameters for distinguishing real-time packets. In one embodiment, the parameters include an allowable range of real-time packet length, an allowable range of real-time packet arrival rate, an allowable range of inter-arrival time standard deviation of the real-time packet, an allowable range of real-time packet length standard deviation, a number of reference packets. For example, the allowable range of the real-time packet length is [170 bytes, 180 bytes]. The allowable range of the real-time packet arrival rate is [20 packets per a second (p/s), 25 p/s]. The allowable range of the inter-arrival time standard deviation of the real-time packet is [10 bytes, 20 bytes]. The allowable range of the real-time packet length standard deviation is [0.5 seconds (s), 2s]. It should be understood that the term "reference packets" may be defined as packets to determine if the test packets are the real-time packets. For example, if the number of reference packets is n, the n reference packets are used to determine if the test packets are real-time packets. As shown in FIG. 4, if the packet $P_{n+1}$ is desired to be tested, then the packets $P_1, P_2, P_3, \ldots, P_{n-1}$, and $P_n$ are reference packets for the test packet $P_{n+1}$. After test packet $P_{n+1}$ is determined by the reference packets, the test packet $P_{n+1}$ becomes one of the reference packets for the next test packet $P_{n+2}$. For example, the test packet $P_{n+2}$ is determined by the reference packets $P_2$, $P_3, \ldots, P_{n-1}, P_n$, and the reference packet $P_{n+1}$. Additionally, the reference packets are consecutive.

In block S20, the reading module 220 reads information of the reference packets and the packet length of the test packet. In one embodiment, the information of the reference packets includes a total time that the router 20 receives all of the reference packets and the test packet, an inter-arrival time between two consecutive reference packets and a packet length of each reference packet. As shown in FIG. 4, the reading module reads information of $P_1, P_2, P_3, \ldots, P_{n+1}, P_n$, and reads the packet length of $P_{n+1}$. For example, as shown in FIG. 4, the total time is T, and the inter-arrival time between the reference packets $P_1$ and $P_2$ is T1.

In block S30, the calculating module 230 calculates the packet arrival rate of the test packet, the inter-arrival time standard deviation of the test packet, the packet length standard deviation of the test packet according to the information of the reference packets. As mentioned above, the packet arrival rate of the test packet is calculated by the formula $R_{n+j}$, the inter-arrival time standard deviation of the test packet is calculated by the formula $I_{n+j}$, and the packet length standard deviation of the test packet is calculated by the formula $D_{n+j}$.

In block S40, the determination module 240 determines if the test packets are the real-time packets. The procedure goes to block S50 if the packet length of the test packet $P_{n+1}$ falls in [170 bytes, 180 bytes], the packet arrival rate of the reference packets falls in [20 p/s, 25 p/s], the inter-arrival time standard deviation of the test packet $P_{n+1}$ falls in [10 bytes, 20 bytes], and the packet length standard deviation of the test packet $P_{n+1}$ falls in [0.5s, 2s]. The procedure goes to end if the packet length of the test packet $P_{n+1}$ does not fall in [170 bytes, 180 bytes], the packet arrival rate of the reference packets does not fall in [20 p/s, 25 p/s], the inter-arrival time standard deviation of the test packet $P_{n+1}$ does not fall in [10 bytes, 20 bytes], and the packet length standard deviation of the test packet $P_{n+1}$ does not fall in [0.5s, 2s].

In block S50, the mark module 250 marks the test packet as the real-time packet. In one embodiment, if the test packet is determined as the real-time packet, the mark module 250 inserts a tag into the test packet. It is understood that the tag includes attribute information that indicates the packet as the real-time packet. The network device (e.g., a switch, a modem or a router 20) may easily and quickly identify the packet as the real-time packet when the network device reads the tag. For example, if the test packet $P_{n+1}$ is determined as a real-time packet, the mark module 250 inserts a tag into the test packet $P_{n+1}$.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A router, comprising:
    a storage system;
    at least one processor; and
    one or more programs stored in the storage system and being executable by the at least one processor, the one or more programs comprising:
    a setting module operable to set parameters for distinguishing real-time packets, wherein the parameters comprise a first allowable range of a packet length, a second allowable range of a packet arrival rate, a third allowable range of an inter-arrival time standard deviation, a fourth allowable range of a packet length standard deviation, and a number of reference packets;
    a reading module operable to read information of the reference packets and the packet lengths of a plurality of test packets;
    a calculating module operable to calculate the packet arrival rate of the test packets, the inter-arrival time standard deviation of the test packets, and the packet length standard deviation of the test packets according to the information of the reference packets;
    a determination module operable to determine if a test packet is a real-time packet according to the packet length of the test packets, the calculated packet arrival rate of the test packets, the calculated inter-arrival time standard deviation of the test packets, and the calculated the packet length standard deviation of the test packets; and
    a mark module operable to mark the test packet as the real-time packet in response to a determination that the packet length of the test packets falls in the first allowable range, the packet arrival rate of the test packets falls in the second allowable range, the inter-arrival time standard deviation of the test packets falls in the third allowable range, and the packet length standard deviation of the test packets falls in the fourth allowable range.

2. The router of claim 1, wherein the information of the reference packets comprises a total time that the router receives all of the reference packets and the test packets, an inter-arrival time between two consecutive reference packets and the packet length of each reference packet.

3. The router of claim 1, wherein the packet arrival rate of the test packets $P_{n+j}$ is calculated as follows:

$$R_{n+j} = (n+j)/T, j=1, 2, 3, \ldots;$$

wherein, n is equal to the number of the reference packets, T is the total time that router receives all of the reference packets from $P_1$ to $P_{n+j}$.

4. The router of claim 3, wherein the inter-arrival time standard deviation of the test packets $P_{n+j}$ is calculated as follows:

$$I_{n+j} = \sqrt{\frac{\sum_{i=j}^{n+j-2}(t_i - \bar{t})^2}{n-1}}, i = j, j = 1, 2, 3\ldots$$

wherein, n is equal to the number of the reference packets, $t_i$ is the inter-arrival time between the reference packet $P_{i+j-1}$ and the reference packet $P_{i+j-2}$, and $\bar{t}$ is an average inter-arrival time of all reference packets from $P_j$ to $P_{n+j-1}$.

5. The router of claim 3, wherein the packet length standard deviation of the test packets $P_{n+j}$ is calculated as follows:

$$D_{n+j} = \sqrt{\frac{\sum_{i=j}^{n+j-1}(h_i - \bar{h})^2}{n}}, i = j, j = 1, 2, 3\ldots$$

wherein, n is equal to the number of the reference packets, $h_i$ is the packet length of the reference packet $P_{i+j-1}$ and $\bar{h}$ is an average packet length of all reference packets from $P_j$ to $P_{n+j-1}$.

6. The router of claim 1, wherein the test packet is marked by inserting a tag into the test packet.

7. A computer-based method for distinguishing real-time packets in a router, the method comprising:
    setting parameters for distinguishing real-time packets by the router, wherein the parameters comprise a first allowable range of a packet length, a second allowable range of a packet arrival rate, a third allowable range of an inter-arrival time standard deviation, a fourth allowable range of a packet length standard deviation, and a number of reference packets;
    reading information of the reference packets and the packet lengths of a plurality of test packets by the router;
    calculating the packet arrival rate of the test packets, the inter-arrival time standard deviation of the test packets, and the packet length standard deviation of the test packets according to the information of the reference packets by the router;
    determining if a test packet is a real-time packet according to the packet length of the test packets, the calculated packet arrival rate of the test packets, the calculated inter-arrival time standard deviation of the test packets, and the calculated the packet length standard deviation of the test packets by the router; and
    marking the test packet as the real-time packet by the router in response to a determination that the packet length of the test packets falls in the first allowable range, the packet arrival rate of the test packets falls in the second allowable range, the inter-arrival time standard deviation of the test packets falls in the third allowable range, and the packet length standard deviation of the test packets falls in the fourth allowable range.

8. The method of claim 7, wherein the information of the reference packets comprises a total time that the router receives all of the reference packets and the test packets, an inter-arrival time between two consecutive reference packets and the packet length of each reference packet.

9. The method of claim 7, wherein the packet arrival rate of the test packets $P_{n+j}$ is calculated as follows:

$$R_{n+j} = (n+j)/T, j=1, 2, 3, \ldots;$$

wherein, n is equal to the number of the reference packets, T is the total time that the router receives all of the reference packets from $P_1$ to $P_{n+j}$.

10. The method of claim 9, wherein the inter-arrival time standard deviation of the test packets $P_{n+j}$ is calculated as follows:

$$I_{n+j} = \sqrt{\frac{\sum_{i=j}^{n+j-2}(t_i - \bar{t})^2}{n-1}}, i = j, j = 1, 2, 3\ldots$$

wherein, n is equal to the number of the reference packets, $t_i$ is the inter-arrival time between the reference packet $P_{i+j-1}$ and the reference packet $P_{i+j-2}$, and $\bar{t}$ is an average inter-arrival time of all reference packets from $P_j$ to $P_{n+j-1}$.

11. The method of claim 9, wherein the packet length standard deviation of the test packets $P_{n+j}$ is calculated as follows:

$$D_{n+j} = \sqrt{\frac{\sum_{i=j}^{n+j-1}(h_i - \bar{h})^2}{n}}, i = j, j = 1, 2, 3\ldots$$

wherein, n is equal to the number of the reference packets, $h_i$ is the packet length of the reference packet $P_{i+j-1}$, and $\bar{h}$ is an average packet length of all reference packets from $P_j$ to $P_{n+j-1}$.

12. The method of claim 7, wherein the test packet is marked by inserting a tag into the test packet.

13. A non-transitory computer-readable medium having stored thereon instructions that, when executed by a computing device, causing the computing device to perform a method for distinguishing real-time packets in a router, the method comprising:
    setting parameters for distinguishing real-time packets by the router, wherein the parameters comprise a first allowable range of a packet length, a second allowable range of a packet arrival rate, a third allowable range of an inter-arrival time standard deviation, a fourth allowable range of a packet length standard deviation, and a number of reference packets;
    reading information of the reference packets and the packet lengths of a plurality of test packets by the router;
    calculating the packet arrival rate of the test packets, the inter-arrival time standard deviation of the test packets, and the packet length standard deviation of the test packets according to the information of the reference packets by the router;
    determining if a test packet is a real-time packet according to the packet length of the test packets, the calculated packet arrival rate of the test packets, the calculated inter-arrival time standard deviation of the test packets, and the calculated the packet length standard deviation of the test packets by the router; and
    marking the test packet as the real-time packet by the router in response to a determination that the packet length of the test packets falls in the first allowable range, the packet arrival rate of the test packets falls in the second allowable range, the inter-arrival time standard deviation of the test packets falls in the third allowable range, and the packet length standard deviation of the test packets falls in the fourth allowable range.

14. The non-transitory medium of claim 13, wherein the information of the reference packets comprises a total time that the router receives all of the reference packets and the test packets, an inter-arrival time between two consecutive reference packets and the packet length of each reference packet.

15. The non-transitory medium of claim 13, wherein the packet arrival rate of the test packets $P_{n+j}$ is calculated as follows:

$$R_{n+j} = (n+j)/T, j=1, 2, 3, \ldots;$$

wherein, n is equal to the number of the reference packets, T is the total time that the router receives all of the reference packets from $P_1$ to $P_{n+j}$.

16. The non-transitory medium of claim 15, wherein the inter-arrival time standard deviation of the test packets $P_{n+j}$ is calculated as follows:

$$I_{n+j} = \sqrt{\frac{\sum_{i=j}^{n+j-2}(t_i - \bar{t})^2}{n-1}}, i = j, j = 1, 2, 3\ldots$$

wherein, n is equal to the number of the reference packets, $t_i$ is the inter-arrival time between the reference packet $P_{i+j-1}$ and the reference packet $P_{i+j-2}$, and $\bar{t}$ is an average inter-arrival time of all reference packets from $P_j$ to $P_{n+j-1}$.

17. The non-transitory medium of claim 15, wherein the packet length standard deviation of the test packets $P_{n+j}$ is calculated as follows:

$$D_{n+j} = \sqrt{\frac{\sum_{i=j}^{n+j-1}(h_i - \bar{h})^2}{n}}, i = j, j = 1, 2, 3\ldots$$

wherein, n is equal to the number of the reference packets, $h_i$ is the packet length of the reference packet $P_{i+j-1}$ and $\bar{h}$ is an average packet length of all reference packets from $P_j$ to $P_{n+j-1}$.

18. The non-transitory medium of claim 13, wherein the test packet is marked by inserting a tag into the test packet.

* * * * *